UNITED STATES PATENT OFFICE.

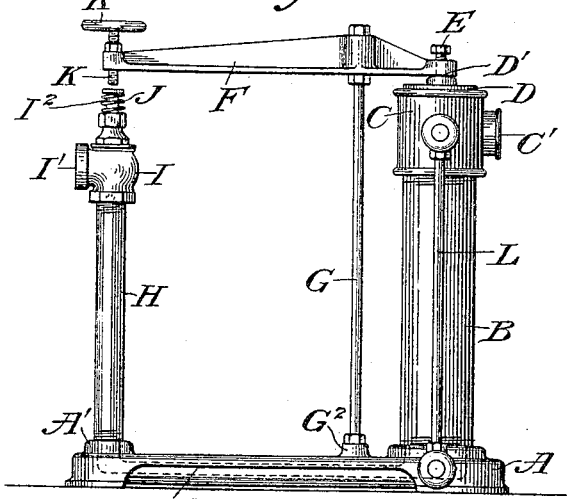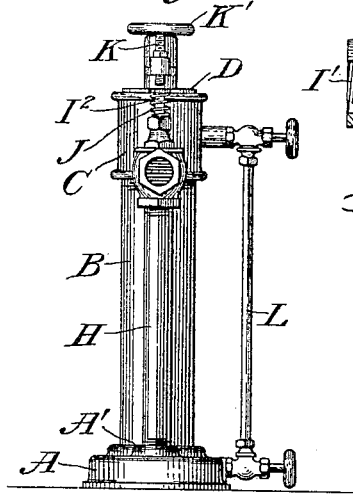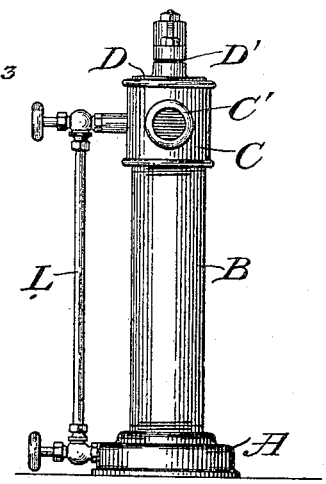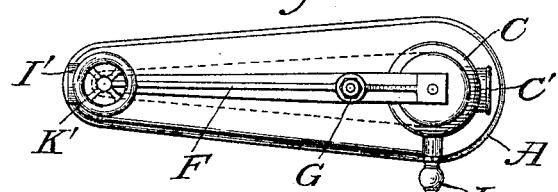

EDWIN FIDELL, OF JERSEY CITY, NEW JERSEY.

STEAM-TRAP.

No. 801,309.　　　Specification of Letters Patent.　　　Patented Oct. 10, 1905.

Application filed September 9, 1904. Serial No. 223,830.

*To all whom it may concern:*

Be it known that I, EDWIN FIDELL, residing in Jersey City, Hudson county, and State of New Jersey, have invented certain new and useful Improvements in Steam-Traps, of which the following is a specification.

My invention relates to "steam-traps" of the expansion type wherein the expansion and contraction of certain parts operate the valve which controls the condensed water.

The object of my invention is to make a trap which is reliable in its action, simple in its construction, and of large drainage capacity and one which may be made from standard fittings, if desired, in cases of emergency.

Referring to the drawings, which form part of this specification, and in which similar letters of reference indicate identical parts, Figure 1 is an exterior elevational view of my improved "trap," showing one side. Fig. 2 is an end view of the same viewed from the left side of the drawing. Fig. 3 is an end view of same viewed from the right side of drawing. Fig. 4 is a plan view of the trap. Fig. 5 shows the valve, partly in section, with a spring on the top to hold the valve open.

Referring to Fig. 1, A indicates the base of the trap, which in this case is shown as a casting, into which is screwed a section of pipe B about four inches in diameter and two feet long. On the upper end of this pipe is screwed a T C, the top end of which is closed by a screw-plug D, having an oval top at D', where the adjustment-screw C contacts. F is the cross-bar, and G is the fulcrum-rod to which the cross-bar F is firmly screwed at G', and its opposite end is screwed into the base A at G². On the other end of base A at A' is another section of pipe H of about one-half the diameter of the pipe B, also screwed into the base A, and cored in the base A is a conduit A², which joins the pipe B and H, and thus forms a continuous conduit from the T C to the valve-casing I. C' is the inlet to this conduit and I' the outlet thereof.

In the valve-casing I (shown partly in section in Fig. 5) is a valve I³, held open by the spring J, as shown; but this spring could be dispensed with, if desired, without hindering the operation of the trap.

K is an adjustable screw operated by the hand-wheel K' for adjusting the distance between the valve-rod I², and L is a water-gage through which the operation of the trap may be observed. This gage may be attached to the base A and T C, as illustrated in the drawings, or could be attached directly to the pipe B, if preferred.

It is obvious that this trap can be made entirely from standard fittings, for the base A might be dispensed with and the pipe H bent to form the horizontal conduit and could be joined to the pipe B by an elbow where the pipe B now screws into the base A. It is also apparent that the T C might be dispensed with by bending the pipe B at a right angle at its top end and using the open end as the entrance of the conduit C', or it might be extended to occupy the space now used by the T C and plugged as the T C is now plugged and a hole drilled in the side at C' for the inlet of the trap. The bar F could be made of bar-iron also, so that this trap could be made in case of necessity from standard fittings and parts.

The distance of the fulcrum from F to G' is about one-third as great as from G' to K; but this distance may be changed somewhat, depending on what metal is used in the pipes B and H. I prefer brass for these pipes; but any other good expansible metal will answer the purpose. I wish to note also that the pipes B and H may be of the same size in diameter and still operate fairly well, and they may be longer or shorter and made to operate the valve by changing the distance of the fulcrum or increasing or decreasing the distance between the pipes B and H accordingly. Also the base A and pipes B and H might all be made in one casting, if desired.

Having described the several parts, I will now describe the operation.

The condensed steam enters the trap C' and flows downward through pipe B and through conduit in base A and into pipe H and through valve I³ and outlet I'. This water would continue to flow as long as water was in the trap; but when the steam enters at C' and forces the water ahead of it the increase in temperature of the steam immediately causes the pipe B to expand in length, thus forcing the short end of the cross-bar F upward, which bends the fulcrum-rod G and forces the screw K against the valve-stem I² and causes the valve to start to close. By the time the steam reaches the pipe H this pipe also becomes heated to a greater degree and also expands, thus moving in a direction to coöperate, through the medium of the cross-bar F, with the pipe B in closing the valve I³. Thus the trap is closed before any steam can escape. It will now be understood why it is preferable to make the pipe H smaller than pipe B, as the time required to force the volume of water in the pipe B through the smaller pipe H gives the metal time to absorb the heat, and thus expand to close the valve before the steam can follow and escape through the same. The design may be modified and the measurements of the parts changed to alter the capacity of the different sizes in marketing the same without changing the fundamental principle of construction. The dimensions given herein are those of a trap now in successful operation, the pipes of which are made of brass.

Having thus described my invention, what I claim as new is—

1. In a trap of the character described, a base supporting two expanding members having a conduit, one of said expanding members being provided with an inlet and the other of said members being provided with an outlet, a valve controlling the outlet and means for operating said valve, the inlet member being relatively of large diameter to the outlet member, substantially as described.

2. In a trap of the character described, a base supporting two expanding members, a conduit, a valve controlling said conduit, said valve being mounted directly on the top of one of said expanding members, and means for operating said valve by the expansion of one or both of said members, substantially as described.

3. In a trap of the character described, the combination of the base A, having the pipe B, secured thereto at one end and the T C mounted on the top of the pipe B, the cross-bar F, the rod G, the pipe H, having the valve I mounted directly on its top and arranged substantially as shown and described.

4. In a trap of the character described, a base supporting two expanding members, a conduit through said member and base, a valve controlling said conduit a cross-bar extending from one of said expanding members to the other, a fulcrum for said bar, and means for operating said valve through said cross-bar by said expanding member.

5. In a trap of the character described, a base supporting two expanding members, a conduit through said members and base, a valve controlling said conduit, a cross-bar extending from one of said expanding members to the other, a fulcrum for said bar, means for operating said valve through said cross-bar by said expanding members and visible means of observing the operation of the trap.

6. In a trap of the character described, a base supporting two expanding members, a conduit through said members and base, a valve controlling said conduit, a cross-bar extending from one of said expanding members to the other a fulcrum for said bar, means for operating said valve through said cross-bar by said expanding members, and means for adjusting the degree of opening of said valve.

In testimony whereof I have signed my name to this specification in the presence of two subscribing witnesses.

EDWIN FIDELL.

Witnesses:
FRANK M. SCHLEY,
KATHERINE V. HALLIHAN.